United States Patent
Otsuka et al.

(10) Patent No.: US 10,876,498 B2
(45) Date of Patent: Dec. 29, 2020

(54) FUEL VAPOR TREATMENT APPARATUS

(71) Applicant: TOYOTA JIDOSHA KABUSHIKI KAISHA, Toyota (JP)

(72) Inventors: Masaya Otsuka, Miyoshi (JP); Yoshitomo Mizuta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/268,667

(22) Filed: Feb. 6, 2019

(65) Prior Publication Data

US 2019/0257272 A1    Aug. 22, 2019

(30) Foreign Application Priority Data

Feb. 22, 2018   (JP) ................. 2018-029635

(51) Int. Cl.
*F02M 25/08* (2006.01)
*F02D 41/00* (2006.01)
*B60K 15/035* (2006.01)

(52) U.S. Cl.
CPC ... *F02M 25/0836* (2013.01); *B60K 15/03504* (2013.01); *F02D 41/004* (2013.01); *F02M 25/089* (2013.01); *F02M 25/0872* (2013.01); *B60K 2015/03514* (2013.01)

(58) Field of Classification Search
None
See application file for complete search history.

(56) References Cited

U.S. PATENT DOCUMENTS

| 4,280,360 | A | * | 7/1981 | Kobayashi | G01F 1/3209 73/198 |
| 4,375,204 | A | * | 3/1983 | Yamamoto | F02M 35/021 123/494 |
| 5,188,085 | A | * | 2/1993 | Habaguchi | F02D 41/0045 123/520 |
| 5,216,997 | A | * | 6/1993 | Osanai | F02D 41/004 123/198 DB |
| 5,253,517 | A | * | 10/1993 | Molin | G01F 1/6842 73/114.32 |

(Continued)

FOREIGN PATENT DOCUMENTS

| EP | 0733794 A2 | 9/1996 |
| JP | 2007-016654 A | 1/2007 |

(Continued)

*Primary Examiner* — Kevin R Steckbauer
(74) *Attorney, Agent, or Firm* — Oliff PLC

(57) ABSTRACT

A fuel vapor treatment apparatus includes a canister into which fuel vapor generated in a fuel tank is introduced, and the canister is configured to absorb the fuel vapor. An outside air introducing passage is connected with the canister and introduces outside air to the canister. The purge passage connects the canister and a portion of an air intake passage, the portion being located downstream of a throttle valve. The purge valve is provided in the purge passage and switches a channel of the purge passage to one of an open state and a closed state. A flow straightening device is provided in an area extending from a connecting place at which an exit portion of the purge valve is connected to the purge passage, to a connecting place at which the purge passage is connected to the air intake passage.

7 Claims, 5 Drawing Sheets

(56) References Cited

U.S. PATENT DOCUMENTS

| | | | | |
|---|---|---|---|---|
| 5,299,544 A * | 4/1994 | Kitamoto | ............... | F02M 25/08 123/198 D |
| 5,669,362 A * | 9/1997 | Shinohara | .......... | F02M 25/0809 123/520 |
| 7,320,315 B2 * | 1/2008 | Amano | ............... | F01M 13/023 123/357 |
| 7,484,501 B2 * | 2/2009 | Amano | ............... | F02D 41/0032 123/520 |
| 8,801,840 B2 * | 8/2014 | Sugiura | ............. | B01D 53/0407 96/131 |
| 9,168,829 B2 * | 10/2015 | Dong | ..................... | B01D 53/04 |
| 9,228,540 B2 * | 1/2016 | Yamamoto | ......... | F02M 25/0854 |
| 9,310,349 B2 * | 4/2016 | Balsdon | ............... | G01N 29/024 |
| 9,494,947 B2 * | 11/2016 | Hirata | ....................... | G01F 1/50 |
| 9,870,006 B2 * | 1/2018 | Hirata | ....................... | G01F 1/36 |
| 10,526,985 B2 * | 1/2020 | Asanuma | ............ | F02M 25/089 |
| 2003/0154963 A1 * | 8/2003 | Furushou | ............ | F02D 41/0032 123/520 |
| 2004/0003650 A1 * | 1/2004 | Strohrmann | ........... | F02M 35/02 73/31.05 |
| 2007/0175455 A1 * | 8/2007 | Amano | ............... | F02D 41/0045 123/520 |
| 2007/0295313 A1 * | 12/2007 | Amano | ............... | F02M 25/0836 123/520 |
| 2008/0257160 A1 | 10/2008 | Yoshida et al. | | |
| 2012/0304865 A1 * | 12/2012 | Sugiura | ............. | B01D 53/0446 96/131 |
| 2013/0000610 A1 * | 1/2013 | Yamamoto | ........... | F02M 25/089 123/519 |
| 2013/0152905 A1 * | 6/2013 | Woods | ................. | G01N 29/024 123/520 |
| 2014/0182692 A1 * | 7/2014 | Hirata | .................. | G05D 7/0617 137/10 |
| 2015/0021407 A1 * | 1/2015 | Dong | .................... | B60K 15/04 239/8 |
| 2015/0160180 A1 * | 6/2015 | Balsdon | ................. | G01N 29/02 123/519 |
| 2016/0298663 A1 * | 10/2016 | Stahl | .................. | B01J 20/28045 |
| 2016/0305352 A1 | 10/2016 | Pursifull et al. | | |
| 2016/0370808 A1 * | 12/2016 | Hirata | ....................... | G01F 1/50 |
| 2018/0372028 A1 * | 12/2018 | Nakata | ............... | F02M 25/0836 |
| 2019/0285011 A1 * | 9/2019 | Asanuma | ............... | F02M 25/08 |
| 2019/0331036 A1 * | 10/2019 | Asanuma | ............ | F02D 41/0045 |

FOREIGN PATENT DOCUMENTS

| | | |
|---|---|---|
| JP | 2013-241855 A | 12/2013 |
| JP | 2017-066942 A | 4/2017 |

* cited by examiner

INTAKE PASSAGE SIDE ← CANISTER SIDE
GAS FLOW DIRECTION

FUEL VAPOR TREATMENT APPARATUS

INCORPORATION BY REFERENCE

The disclosure of Japanese Patent Application No. 2018-029635 filed on Feb. 22, 2018 including the specification, drawings and abstract is incorporated herein by reference in its entirety.

BACKGROUND

1. Technical Field

The disclosure relates to a fuel vapor treatment apparatus.

2. Description of Related Art

A fuel vapor treatment apparatus described in Japanese Unexamined Patent Application Publication No. 2013-241855 (JP 2013-241855 A) includes a canister into which fuel vapor generated in a fuel tank of an internal combustion engine is introduced. The canister absorbs the fuel vapor generated in the fuel tank. An outside air introducing passage is connected with the canister. The outside air introducing passage introduces outside air into the canister. Further, the canister is connected with a portion of an air intake passage through a purge passage, the portion being located downstream of a throttle valve. A purge valve is attached to the purge passage. The purge valve switches a channel of the purge passage to one of an open state and a closed state.

In the fuel vapor treatment apparatus according to JP 2013-241855 A, when the channel of the purge passage is brought to the closed state by the purge valve, fuel vapor generated in the fuel tank flows into the canister and is absorbed inside the canister. Meanwhile, when the channel of the purge passage is brought to the open state by the purge valve, outside air flows into the canister through the outside air introducing passage due to negative pressure of the air intake passage. Then, the fuel vapor absorbed inside the canister and outside air flow into the air intake passage through the purge passage.

SUMMARY

In the fuel vapor treatment apparatus described in JP 2013-241855 A, when fuel vapor and outside air flow into the air intake passage through the purge passage, a difference between pressure at a position upstream of the purge valve and pressure at a position downstream of the purge valve becomes great. Then, in an area downstream of the purge valve, gas flow speed becomes high. When gas flow speed becomes high as stated above, a gas swirl occurs near an exit portion of the purge valve, and the swirl may cause flow noise. When flow noise occurs as stated above, an occupant of a vehicle may perceive the flow noise as undesired sound, which is not desirable.

A fuel vapor treatment apparatus according to an aspect of the disclosure includes a canister, an outside air introducing passage, a purge passage, and a purge valve. Fuel vapor generated in a fuel tank is introduced to the canister, and the canister is configured to absorb the fuel vapor. The outside air introducing passage is connected with the canister and introduces outside air to the canister. The purge passage connects the canister and a portion of an air intake passage, the portion of the air intake passage being located downstream of a throttle valve. The purge valve is provided in the purge passage and switches a channel of the purge passage to one of an open state and a closed state. In the fuel vapor treatment apparatus, a flow straightening device is provided in an area extending from a connecting place at which an exit portion of the purge valve is connected to the purge passage, to a connecting place at which the purge passage is connected to the air intake passage.

In the foregoing configuration, a plurality of flow straightening chambers may be provided inside the flow straightening device, and the flow straightening chambers may be arranged in at least one direction orthogonal to a gas flow direction.

With the foregoing configuration, a flow direction of gas flowing in each of the flow straightening chambers is substantially straightened (i.e., adjusted) by inner wall surfaces of the flow straightening chambers. Therefore, gas that flows out from one of the flow straightening chambers is unlikely to spread towards gas that flows out from another flow straightening chamber. Thus, it is possible to restrain occurrence of a swirl due to turbulence of the gas flow in an area downstream of the flow straightening device. As a result, it is possible to restrain flow noise associated with occurrence of the gas swirl.

In the foregoing configuration, the flow straightening device may include a first partition wall and a second partition wall. The first partition wall divides an interior space of the flow straightening device in a first direction orthogonal to the gas flow direction, and the second partition wall divides the interior space of the flow straightening device in a second direction orthogonal to the gas flow direction and the first direction. At least two adjacent flow straightening chambers among the flow straightening chambers formed by the first partition wall and the second partition wall have the same shape in a view of the flow straightening device seen in the gas flow direction.

With the foregoing configuration, it is possible to restrain turbulence of the gas flow in the first direction and in the second direction among directions orthogonal to the gas flow direction. Therefore, with the foregoing configuration, it is possible to restrain occurrence of a gas swirl in various forms, thereby restraining occurrence of flow noise.

Also, with the foregoing configuration, it is considered that gas similarly flows into at least the flow straightening chambers having the same shape in the view of the flow straightening device seen in the gas flow direction. Therefore, it is possible to restrain gas from flowing into a specific flow straightening chamber intensively. As described earlier, by uniformizing an amount of gas flowing in each of the flow straightening chambers, it is possible to reduce the possibility that flows of gas flowing out from the flow straightening chambers affect each other, and thus, it is possible to restrain occurrence of a swirl.

In the foregoing configuration, a total sectional area of channels of the flow straightening chambers may be 50% or smaller of a sectional area of a portion of a channel extending from the connecting place at which the exit portion of the purge valve is connected to the purge passage, to the connecting place at which the purge passage is connected to the air intake passage, the portion of the channel being located immediately upstream of the flow straightening device in the gas flow direction.

With the above configuration, the flow straightening device reduces the sectional area of the channel where gas flows, and the gas flow is hindered in upstream portions of the flow straightening chambers. Thus, gas flow speed is reduced, thereby restraining occurrence of a gas swirl.

In the above configuration, the flow straightening device may be disposed at the connecting place at which the exit portion of the purge valve is connected to the purge passage, or a position adjacent to and downstream of the connecting place in a gas flow direction.

In the configuration, when gas flows into the air intake passage through the purge passage, gas flow speed tends to be highest at the connecting place at which the exit of the purge valve is connected to the purge passage, and thus, a gas swirl is likely to occur. Providing the flow straightening device as in the above configuration is suitable for restraining occurrence of a gas swirl.

In the configuration, the purge passage may be connected with a surge tank of the air intake passage. With the configuration, if flow noise caused by a gas swirl is transferred to the surge tank, the flow noise tends to increase in the surge tank. Therefore, in the foregoing configuration where the purge passage is connected with the air intake passage, the configuration with regard to the flow straightening device may be employed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment according to the disclosure is described with reference to FIG. 1 to FIG. 3. First of all, a rough configuration of an internal combustion engine 100 to which the disclosure is applied is described. In the description below, when the terms "upstream" and "downstream" are simply used, they respectively indicate upstream and downstream in flow directions of intake air, exhaust, fuel vapor, and outside air.

Figure 1:
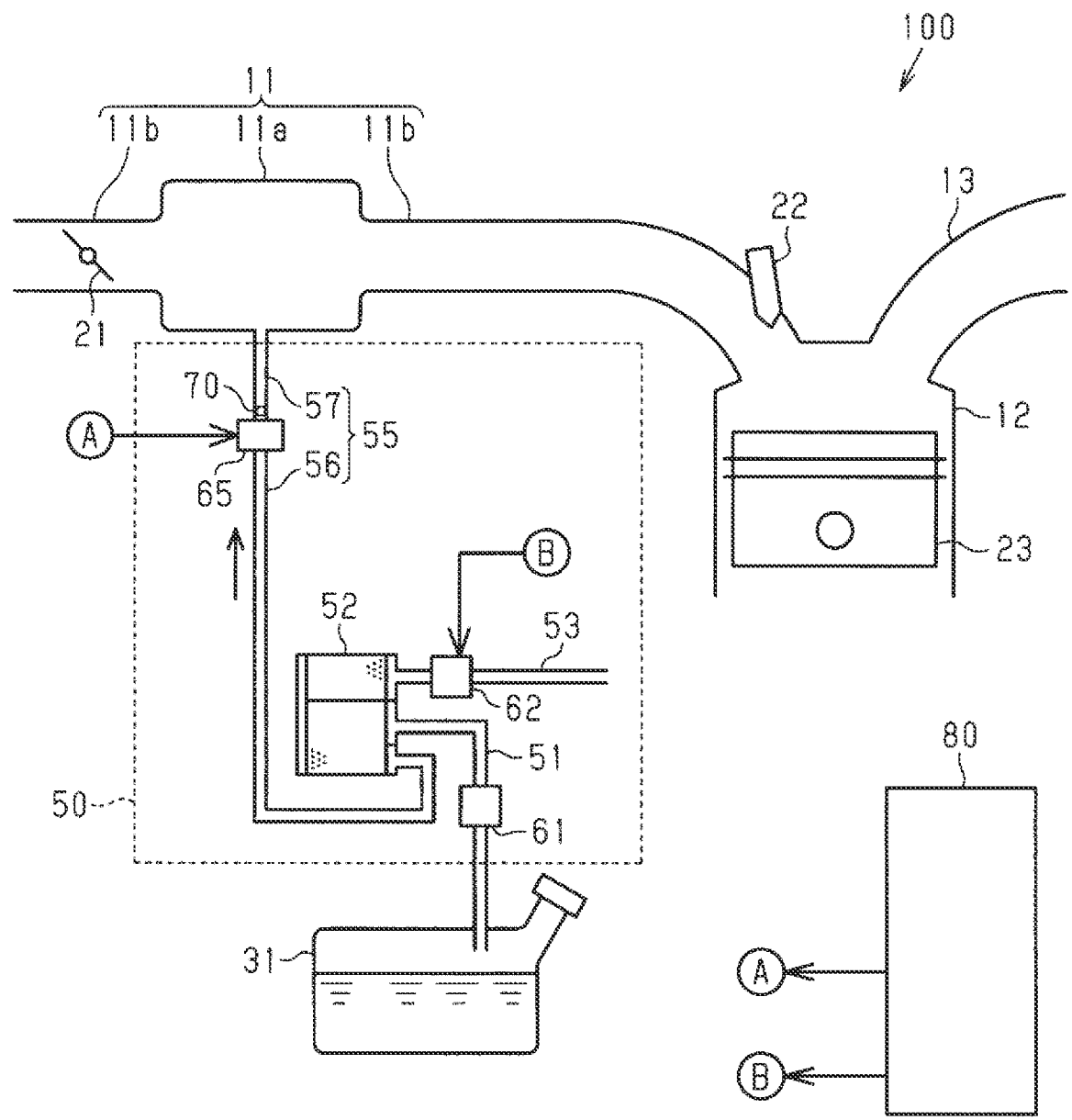
FIG. 1 is a schematic view of an internal combustion engine according to a first embodiment.

As shown in FIG. 1, the internal combustion engine 100 includes an air intake passage 11 that introduces intake air from an outside of the internal combustion engine 100. The air intake passage 11 includes a surge tank 11a and an intake air connecting passage 11b. The surge tank 11a restrains intake air pulsation and so on, and the intake air connecting passage 11b is a portion of the air intake passage 11 other than the surge tank 11a. A sectional area of a channel of the surge tank 11a is larger than a sectional area of a channel of the intake air connecting passage 11b. Therefore, a capacity of the surge tank 11a is larger than a capacity of the intake air connecting passage 11b with the same length as the length of the surge tank 11a, and a certain amount of intake air can be stored inside the surge tank 11a. A throttle valve 21 is disposed in the intake air connecting passage 11b at a position upstream of the surge tank 11a. The throttle valve 21 opens and closes a channel of the air intake passage 11, thereby controlling an amount of intake air flowing in the air intake passage 11.

A cylinder 12 is connected with the intake air connecting passage 11b of the air intake passage 11 at a position downstream of the surge tank 11a. In the cylinder 12, fuel and the intake air are mixed and burned. Fuel is injected into the cylinder 12 by a fuel injection valve 22. Further, inside the cylinder 12, a piston 23 that reciprocates inside the cylinder 12 is disposed. An exhaust passage 13 is connected with the cylinder 12 in order to discharge exhaust gas from the cylinder 12.

The internal combustion engine 100 includes a fuel tank 31 that stores fuel to be supplied to the fuel injection valve 22. A feed pump (not shown) is housed inside the fuel tank 31, and fuel transferred by the feed pump is supplied to the fuel injection valve 22 through a fuel pipe.

A fuel vapor treatment apparatus 50 is connected with the fuel tank 31. The fuel vapor treatment apparatus 50 restrains discharge of fuel vapor generated inside the fuel tank 31 to the atmosphere. The fuel vapor treatment apparatus 50 includes a canister 52 that absorbs fuel vapor generated in the fuel tank 31. One end of a vapor passage 51 where fuel vapor flows is connected with the canister 52. The other end of the vapor passage 51 reaches an inside of the fuel tank 31. In the intermediate portion of the vapor passage 51, a check valve 61 is attached, and the check valve 61 restrains fuel vapor from flowing to a fuel tank 31 side from a canister 52 side.

An outside air introducing passage 53 that introduces outside air into the canister 52 is connected with the canister 52. In an intermediate portion of the outside air introducing passage 53, an outside air introducing valve 62 is attached. The outside air introducing valve 62 switches a channel of the outside air introducing passage 53 to one of an open state and a closed state. In other words, the outside air introducing valve 62 switches the state of the channel of the outside air introducing passage 53 between the open state and the closed state.

A purge passage 55 that connects the canister 52 and the surge tank 11a is connected with the canister 52. Thus, the purge passage 55 is connected with a portion of the air intake passage 11, which is located downstream of the throttle valve 21.

In the embodiment, a tubular steel purge pipe 56 forms a part of the purge passage 55 on the upstream side (the canister 52 side), and a tubular rubber purge hose 57 forms a part of the purge passage 55 on the downstream side (a surge tank 11a side). In a connected portion at which the purge pipe 56 is connected to the purge hose 57, a purge valve 65 is attached. The purge valve 65 switches a channel of the purge passage 55 to one of an open state and a closed state. In other words, the purge valve 65 switches the state of the channel of the purge passage 55 between the open state and the closed state. This means that the purge valve 65 is attached in the intermediate portion of the purge passage 55.

A control device 80 controls the purge valve 65 and the outside air introducing valve 62 such that the purge valve 65 and the outside air introducing valve 62 are opened and closed. The control device 80 outputs a control signal to the purge valve 65 in order to control the purge valve 65 such that the purge valve 65 is opened and closed. Further, the control device 80 outputs a control signal to the outside air introducing valve 62 in order to control the outside air introducing valve 62 such that the outside air introducing valve 62 is opened and closed. In the embodiment, the control device 80 is configured as an electronic control unit (ECU) that controls not only the purge valve 65 and the outside air introducing valve 62, but also the entire internal combustion engine 100 such as opening of the throttle valve 21 and a fuel injection amount of the fuel injection valve 22.

Next, specific description is given regarding a configuration of the purge valve 65 and the vicinity of the purge valve 65. As shown in FIG. 2, the purge valve 65 includes a body portion 66. A communication hole 66a extends through the body portion 66. The communication hole 66a extends in a gas flow direction (a right-left direction in FIG. 2) and has a circular sectional shape. As the communication hole 66a is opened and closed by a valve (not shown), the channel inside the purge valve 65 is switched between the open state and the closed state. A cylindrical entrance portion 67 projects from an end surface of the body portion 66 on the canister 52 side (the right side in FIG. 2). An outside diameter of the entrance portion 67 is substantially the same as an inside diameter of the purge pipe 56. An entrance hole 67a that is an interior space of the entrance portion 67 communicates with the communication hole 66a. A cylindrical exit portion 68 projects from an end surface of the body portion 66 on an air intake passage 11 side (the left side in FIG. 2). An outside diameter of the exit portion 68 is almost the same as an inside diameter of the purge hose 57. An exit hole 68a that is an interior space of the exit portion 68 communicates with the communication hole 66a. In FIG. 2, the configuration of the purge valve 65 is simplified.

An end portion of the purge pipe 56 of the purge passage 55 is connected with the entrance portion 67 of the purge valve 65. In the embodiment, as the entrance portion 67 of the purge valve 65 is inserted into the purge pipe 56, the purge valve 65 and the purge pipe 56 are connected with each other. An end portion of the purge hose 57 of the purge passage 55 is connected with the exit portion 68 of the purge valve 65. In the embodiment, as the exit portion 68 of the purge valve 65 is inserted into the purge hose 57, the purge valve 65 and the purge hose 57 are connected with each other. Here, a connecting place X at which the exit portion 68 of the purge valve 65 is connected to the purge hose 57 of the purge passage 55 is a region where the purge hose 57 covers the exit portion 68 of the purge valve 65 from outside (the entire exit portion 68 in FIG. 2).

A substantially columnar flow straightening device 70 is attached inside the purge hose 57. The flow straightening device 70 is attached so that a central axis direction of the flow straightening device 70 extends along a gas flow direction in the purge hose 57. The flow straightening device 70 is disposed at a position adjacent to and downstream of the exit portion 68 of the purge valve 65. Thus, in the first embodiment, the flow straightening device 70 is disposed at a position adjacent to and downstream of the connecting place X in the gas flow direction. The connecting place X is a place at which the exit portion 68 of the purge valve 65 is connected to the purge hose 57 of the purge passage 55. Also, in the first embodiment, an upstream end portion of the substantially columnar flow straightening device 70 and a downstream end of the exit portion 68 of the purge valve 65 are in contact with each other.

Figure 3:
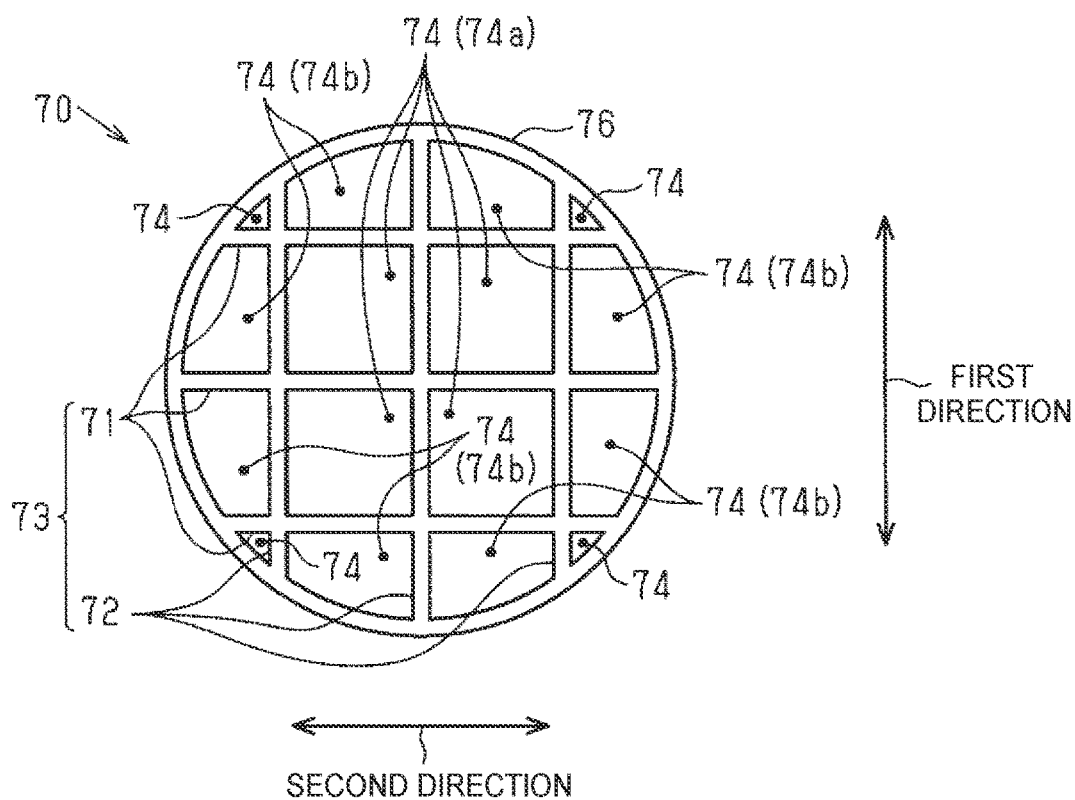
FIG. 3 is a front view of a flow straightening device according to the embodiment.

As shown in FIG. 3, the flow straightening device 70 includes a cylindrical shell portion 76. From an inner surface of the shell portion 76, partition walls 73 extend. The partition walls 73 divide an interior space of the flow straightening device 70 in directions orthogonal to the gas flow direction. The partition walls 73 include first partition walls 71 and second partition walls 72. The first partition walls 71 divide the interior space of the flow straightening device 70 in a first direction orthogonal to the gas flow direction, and the second partition walls 72 divide the interior space of the flow straightening device 70 in a second direction orthogonal to the gas flow direction and the first direction. The first partition walls 71 linearly extend from the inner surface of the shell portion 76 on one side to the inner surface on the other side in the second direction. The first partition walls 71 linearly extend from one end portion of the shell portion 76 to the other end portion of the shell portion 76 in the gas flow direction. In the first embodiment, there are three first partition walls 71 among the partition walls 73, and the first partition walls 71 are disposed at equal intervals.

The second partition walls 72 linearly extend from the inner surface of the shell portion 76 on one side to the inner surface of the shell portion 76 on the other side in the first direction. The second partition walls 72 linearly extend from one end portion of the shell portion 76 to the other end portion of the shell portion 76 in the gas flow direction. In the first embodiment, there are three second partition walls 72 among the partition walls 73, and the second partition walls 72 are disposed at equal intervals.

The interior space of the flow straightening device 70 is divided into 16 (=4×4) flow straightening chambers 74 by the three first partition walls 71 and the three second partition walls 72. In a view of the flow straightening device 70 seen in the gas flow direction, four flow straightening chambers 74a adjacent to each other in the center of the flow straightening chambers 74 have the same square shape. Further, in a view of the flow straightening device 70 seen in the gas flow direction, among the flow straightening chambers 74, eight flow straightening chambers 74b adjacent to each other and positioned around the four flow straightening chambers 74a have same or inverted quadrangle shapes. The eight flow straightening chambers 74b include pairs of the flow straightening chambers 74b, and the flow straightening chambers 74b in each of the pairs are adjacent to each other. In the first embodiment, a material of the flow straightening device 70 is synthetic resin.

Next, actions and effects of the first embodiment are described. As shown in FIG. 1, the control device 80 controls the outside air introducing valve 62 so that the outside air introducing valve 62 is in the open state from the start of the operation of the internal combustion engine 100 to the end of the operation of the internal combustion engine 100.

(1) As shown in FIG. 1, depending on an operation state of the internal combustion engine 100, the control device 80 controls the purge valve 65 so that the purge valve 65 is in the closed state when, for example, an amount of fuel vapor inside the canister 52 is relatively small. Then, the purge valve 65 closes the channel of the purge passage 55. In this case, fuel vapor generated in the fuel tank 31 flows into the canister 52 through the vapor passage 51. The fuel vapor that has flowed into the canister 52 is absorbed inside the canister 52.

Meanwhile, depending on the operation state of the internal combustion engine 100, the control device 80 controls the purge valve 65 so that the purge valve 65 is in the open state when, for example, the amount of fuel vapor inside the canister 52 is relatively large. Then, the purge valve 65 opens the channel of the purge passage 55. In this case, due to negative pressure of the air intake passage 11, outside air flows into the canister 52 through the outside air introducing passage 53. Then, the fuel vapor absorbed inside the canister 52, and the outside air flow into the surge tank 11a of the air intake passage 11 through the purge passage 55.

Figure 2:
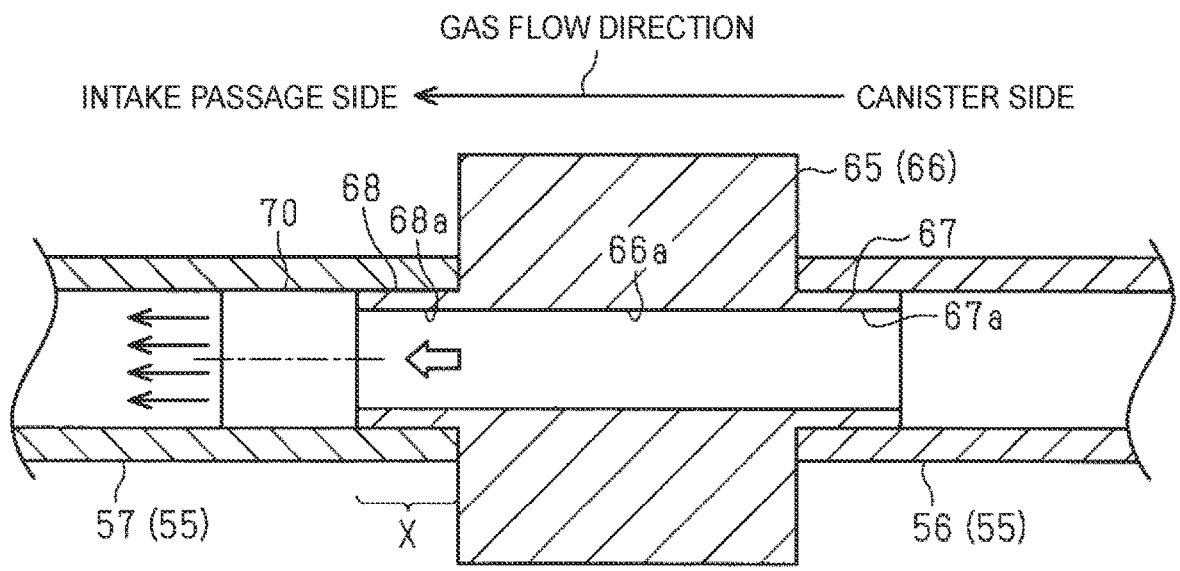
FIG. 2 is a view illustrating a configuration of a purge valve and the vicinity of the purge valve according to the embodiment.

As shown in FIG. 2, when gas containing fuel vapor and outside air flows into the air intake passage 11 through the purge passage 55, a difference between pressure inside the purge pipe 56 at a position upstream of the purge valve 65, and pressure inside the purge hose 57 at a position downstream of the purge valve 65 becomes great. Then, in an area immediately downstream of the connecting place X at which the exit portion 68 of the purge valve 65 is connected to the purge hose 57 of the purge passage 55, flow speed of gas containing fuel vapor and outside air tends to be highest. If no flow straightening device 70 is provided, a flow of the gas containing fuel vapor and outside air is disturbed greatly near the exit portion 68 of the purge valve 65, and a gas swirl is likely to occur, because flow speed of gas containing fuel vapor and outside air increases, and the flow of the gas containing fuel vapor and outside air is disturbed when the gas flows through the communication hole 66a of the purge valve 65 and the like. When the swirl of gas containing fuel vapor and outside air occurs, the gas swirl may cause flow noise.

In the first embodiment, the flow straightening device 70 is positioned in an area extending from the connecting place X at which the exit portion 68 of the purge valve 65 is connected to the purge hose 57 of the purge passage 55, to a connecting place at which the purge hose 57 of the purge passage 55 is connected to the surge tank 11a of the air intake passage 11. Further, the interior space of the flow straightening device 70 is divided into the flow straightening chambers 74 by the partition walls 73. Therefore, a gas flow direction of the gas flowing in the flow straightening chambers 74 is straightened by the partition walls 73 while the gas is flowing through the flow straightening chambers 74. Then, after the gas flows out from each of the flow straightening chambers 74, the gas that flows out from one of the flow straightening chambers 74 is unlikely to spread towards the gas that flows out from another flow straightening chamber 74. Therefore, in an area downstream of the flow straightening device 70, it is possible to restrain a swirl of gas due to turbulence of the gas. As a result, it is possible to restrain flow noise associated with occurrence of a gas swirl.

(2) In the first embodiment, the partition walls 73 include the first partition walls 71 that divide the interior space of the flow straightening device 70 in the first direction, and the second partition walls 72 that divide the interior space of the flow straightening device 70 in the second direction. Therefore, for example, the partition walls 73 restrain gas from flowing in the first direction orthogonal to the gas flow direction, and restrain the gas from flowing in the second direction orthogonal to the gas flow direction and the first direction. This means that the partition walls 73 are able to restrain turbulence of the gas flow in the first direction and in the second direction among the directions orthogonal to the gas flow direction. Therefore, in the first embodiment, it is possible to restrain occurrence of a gas swirl in various forms, thereby restraining occurrence of flow noise in a favorable manner.

(3) In the first embodiment, when the flow straightening device 70 is viewed in the gas flow direction, the four flow straightening chambers 74a adjacent to each other at the center among the flow straightening chambers 74 have the same square shape. Therefore, gas easily flows into each of the four flow straightening chambers 74a in a similar manner. Therefore, it is possible to restrain gas from intensively flowing into a specific flow straightening chamber 74a among the four flow straightening chambers 74a. As described above, by uniformizing an amount of gas flowing in each of the flow straightening chambers 74a, it is possible to reduce the possibility that flows of gas flowing out from the flow straightening chambers 74a affect each other, and thus, it is possible to restrain occurrence of a swirl.

(4) In a view of the flow straightening device 70 seen in the gas flow direction, the flow straightening chambers 74b having same or inverted quadrangle shapes include pairs of the flow straightening chambers 74b, and the flow straightening chambers 74b in each of the pairs are adjacent to each other. Therefore, gas tends to flow in a similar manner into each of the flow straightening chambers 74b that form each of the pairs.

(5) As described above, flow speed of gas containing fuel vapor and outside air tends to be highest and thus a gas swirl is likely to occur in the area immediately downstream of the connecting place X at which the exit portion 68 of the purge valve 65 is connected to the purge hose 57 of the purge passage 55. In the first embodiment, as the flow straightening device 70 is disposed at a position adjacent to and downstream of the connecting place X in the gas flow direction. The connecting place X is a place at which the exit portion 68 of the purge valve 65 is connected to the purge hose 57 of the purge passage 55. Thus, the position of the flow straightening device 70 is highly suitable for restraining occurrence of a swirl near the exit portion 68 of the purge valve 65.

(6) In the first embodiment, the purge hose 57 of the purge passage 55 is connected with the surge tank 11a of the air intake passage 11. Here, if flow noise caused by a gas swirl is transferred to the surge tank 11a, the flow noise tends to increase in the surge tank 11a. Therefore, in the foregoing connecting configuration, the configuration with regard to the flow straightening device 70 may be employed.

Second Embodiment

Next, a second embodiment of the disclosure is described with reference to FIG. 4A, FIG. 4B, and FIG. 5. A rough configuration of an internal combustion engine 100 and a configuration around a purge valve 65 according to the second embodiment are similar to those in the first embodiment, and therefore, drawings and description thereof are omitted.

Figure 4A:
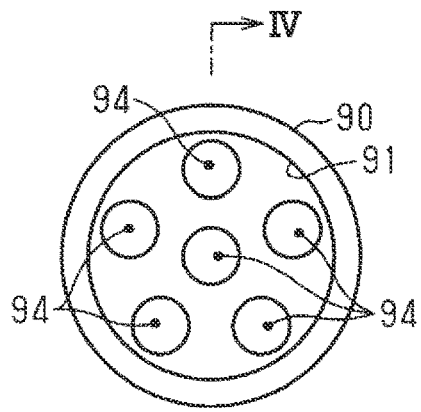
FIG. 4A is a front view of a flow straightening device according to a second embodiment.
Figure 4B:
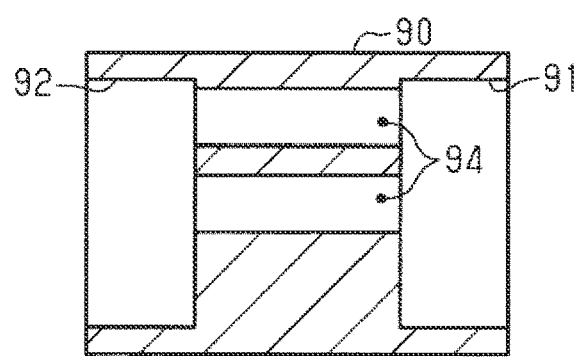
FIG. 4B is a sectional view of the flow straightening device taken along the line IV-IV in FIG. 4A.

As shown in FIG. 4A and FIG. 4B, a flow straightening device 90 has a substantially columnar shape. An outside diameter of the flow straightening device 90 is smaller than the entire length of the flow straightening device 90 in its central axis direction (the right-left direction in FIG. 4B). In the second embodiment, a material of the flow straightening device 90 is synthetic resin.

As shown in FIG. 4B, a substantially columnar first recessed portion 91 is provided in an end surface of the substantially columnar flow straightening device 90 on a canister 52 side (the right side in FIG. 4B). A depth of the first recessed portion 91 is about one-fourth of the entire length of the flow straightening device 90 in its central axis direction (the right-left direction in FIG. 4B). An inside diameter of the first recessed portion 91 is slightly smaller than the outside diameter of the flow straightening device 90. Also, a substantially columnar second recessed portion 92 is provided in an end surface of the substantially columnar flow straightening device 90 on an air intake passage 11 side (the left side in FIG. 4B). A depth of the second recessed portion 92 is about one-fourth of the entire length of the flow straightening device 90 in its central axis direction (the right-left direction in FIG. 4B). An inside diameter of the second recessed portion 92 is the same as the inside diameter of the first recessed portion 91.

As shown in FIG. 4B, six flow straightening chambers 94 extend through the flow straightening device 90 between a bottom surface of the first recessed portion 91 and a bottom surface of the second recessed portion 92. The flow straightening chambers 94 extend in parallel to each other along the central axis of the flow straightening device 90. As shown in FIG. 4A, in a view of the flow straightening device 90 seen in a gas flow direction, each of the flow straightening chambers 94 has a circular shape. In the view seen in the gas flow direction, one of the six flow straightening chambers 94 is positioned at substantially the center of the flow straightening device 90. In the view seen in the gas flow direction, the remaining five flow straightening chambers 94 among six flow straightening chambers 94 are disposed at equal intervals in a circumference direction of the flow straightening chamber 94 positioned at substantially the center of the flow straightening device 90.

Similarly to the configuration shown in FIG. 2, an upstream end portion of the flow straightening device 90 and a downstream end of an exit portion 68 of the purge valve 65 are in contact with each other. Then, in the second embodiment, a channel immediately upstream of the flow straightening device 90 (i.e., a channel immediately before the flow straightening device 90) in the gas flow direction serves as an exit hole 68a of the purge valve 65. The total sectional area of channels of the six flow straightening chambers 94 of the flow straightening device 90 is 50% or smaller of a sectional area of a channel of the exit hole 68a of the purge valve 65. Specifically, in the second embodiment, the total sectional area of the channels of the six flow straightening chambers 94 of the flow straightening device 90 is about 30% of the sectional area of the channel of the exit hole 68a of the purge valve 65.

Described next are actions and effects of the second embodiment. In the second embodiment, the following effects are obtained in addition to effects similar to the effects (1) to (6) described above. (7) In the second embodiment, the total sectional area of the channels of the six flow straightening chambers 94 of the flow straightening device 90 is smaller than the sectional area of the channel of the exit hole 68a of the purge valve 65 immediately upstream of the flow straightening device 90 in the gas flow direction. Therefore, a sectional area of a channel for gas is reduced by the flow straightening device 90, the gas flowing from the connecting place X at which the exit portion 68 of the purge valve 65 is connected to the purge hose 57 of the purge passage 55, to the connecting place at which the purge hose 57 of the purge passage 55 is connected to the surge tank 11a of the air intake passage 11. Then, gas flowing in the flow straightening device 90 from an area upstream of the flow straightening device 90 is hindered by upstream portions of the flow straightening chambers 94. Thus, gas flow speed becomes low inside the flow straightening device 90, and it is thus possible to restrain occurrence of a gas swirl associated with the high flow speed of gas. As a result, it is possible to restrain flow noise associated with occurrence of a gas swirl.

Figure 5:
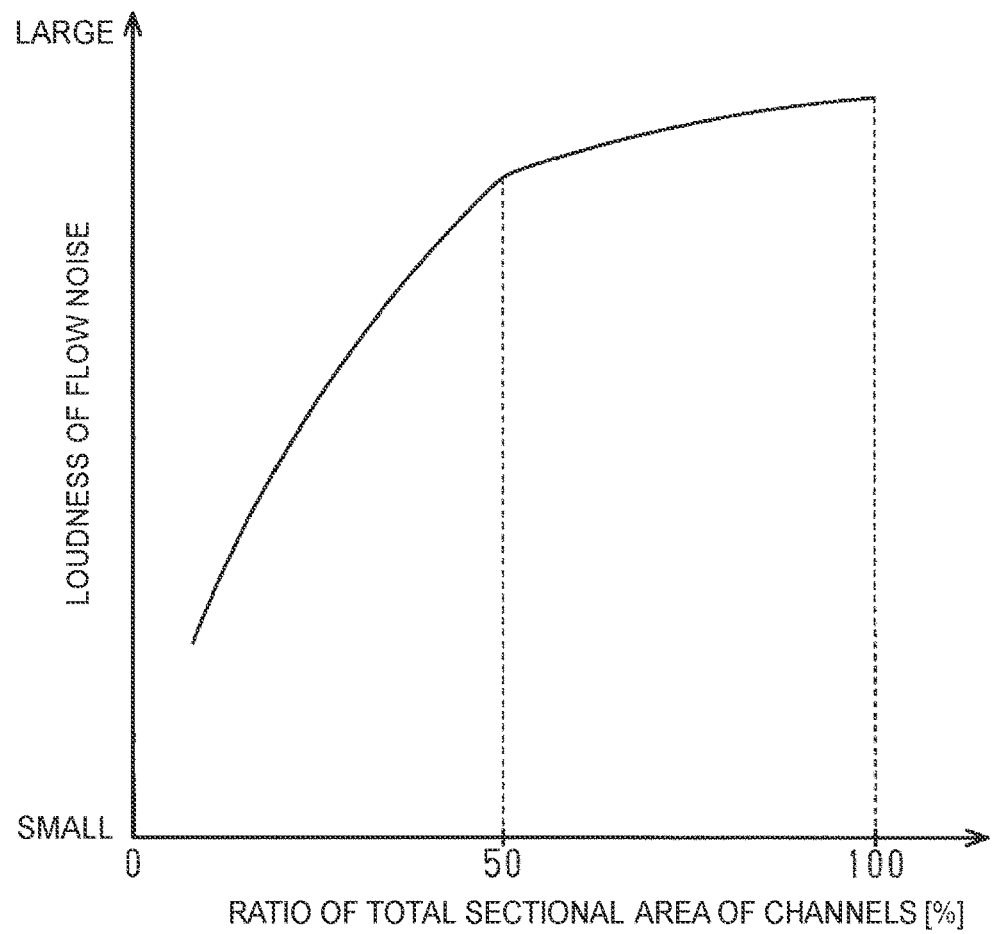
FIG. 5 is a graph showing a relation between a ratio of a total sectional area of channels and loudness of flow noise.

As shown in FIG. 5, loudness of flow noise associated with occurrence of a gas swirl becomes smaller as a ratio of the total sectional area of the channels of the flow straightening chambers 94 of the flow straightening device 90 becomes smaller with respect to the sectional area of the channel immediately upstream of the flow straightening device 90 in the gas flow direction. In a curve that shows loudness of flow noise with respect to a ratio of the total sectional area of the channels, its gradient changes when the ratio of the total sectional area of the channels of the flow straightening chambers 94 of the flow straightening device 90 becomes 50% of the sectional area of the channel immediately upstream of the flow straightening device 90 in the gas flow direction. Specifically, the gradient of the curve when the ratio of the total sectional area of the channels is 50% or lower is larger than the gradient of the curve when the ratio of the total sectional area of the channels exceeds 50%. This means that, when the ratio of the total sectional area of the channels is 50% or lower, the effect of restraining flow noise by reducing the sectional area of the channels becomes remarkably high. In the second embodiment, the total sectional area of the channels of the six flow straightening chambers 94 of the flow straightening device 90 is 50% or smaller of the sectional area of the channel of the exit hole 68a of the purge valve 65 immediately upstream of the flow straightening device 90 in the gas flow direction. Therefore, it is possible to effectively restrain occurrence of flow noise associated with occurrence of a gas swirl.

(8) In the second embodiment, the entire length of the flow straightening device 90 in its central axis direction is larger than the outside diameter of the flow straightening device 90. If the entire length of the flow straightening device 90 in its central axis direction is smaller than the outside diameter of the flow straightening device 90, when the purge hose 57 made of rubber is elastically deformed, the flow straightening device 90 positioned inside the purge hose 57 is easily tilted or rotated with respect to the purge hose 57. On the other hand, in the second embodiment, in comparison to the configuration where the entire length of the flow straightening device 90 in its central axis direction is smaller than the outside diameter of the flow straightening device 90, when the purge hose 57 made of rubber is elastically deformed, the flow straightening device 90 positioned inside the purge hose 57 is not tilted or rotated easily with respect to the purge hose 57. Therefore, in the second embodiment, the flow straightening device 90 is held so that its direction with respect to the purge hose 57 is stable.

(9) In the second embodiment, the material of the flow straightening device 90 is synthetic resin. Therefore, when the flow straightening device 90 is manufactured by resin molding, for example, a first die and a second die are used. The first die has a shape corresponding to the first recessed portion 91 and the flow straightening chambers 94, and the second die has a shape corresponding to the second recessed portion 92. Then, the first die and the second die are disposed so as to face each other, molten synthetic resin is injected into cavities between the first die and the second die, and the synthetic resin is cured inside the cavities, thereby forming the flow straightening device 90. When the flow straightening device 90 has, for example, the flow straightening chambers 94 with a quadrangle shape in a view of the flow straightening device 90 seen in the gas flow direction, portions of the first die corresponding to the flow straightening chambers 94 have a quadrangular prism shape. Then, when the molten synthetic resin is injected into an interior space between the first die and the second die, the molten synthetic resin accumulates around corners of the portions of the first die corresponding to the quadrangle-shaped flow straightening chambers 94 in a plan view. Thus, it is difficult for the molten synthetic resin to flow into the entire cavities. When all parts of the cavities between the first die and the second die are not completely filled with the molten synthetic resin, a manufacturing failure occurs, that is, for example, the desired flow straightening device 90 is not formed. As a result, due to the manufacturing failure of the flow straightening device 90, manufacturing cost for the flow straightening device 90 increases.

In contrast, in the second embodiment, in a view of the flow straightening device 90 seen in the gas flow direction, the flow straightening chambers 94 have the circular shape. Therefore, in the first die that forms the flow straightening device 90, portions corresponding to the flow straightening chambers 94 have a columnar shape. Thus, in the second embodiment, molten synthetic resin tends to flow smoothly along an outer peripheral surface of the columnar shape, and the entire cavities between the first die and the second die are easily filled with the molten synthetic resin. Because of this, a manufacturing failure of the flow straightening device 90 is restrained, and an increase in manufacturing cost due to a manufacturing failure of the flow straightening device 90 is restrained.

The embodiments described above may be changed and carried out as follows. Each of the embodiments and modifications described below may be combined with each other and carried out unless there is any technical inconsistency. In the first embodiment, the number of the first partition walls 71 and the second partition walls 72 of the flow straightening device 70 may be two or less, or four or more. For example, even when there are one first partition wall 71 and one second partition wall 72, two or more flow straightening chambers 74 are formed. Therefore, it is possible to restrain occurrence of a gas swirl. Further, either the first partition walls 71 or the second partition walls 72 may be omitted. In this case, as long as there is one or more first partition walls 71 or one or more second partition walls 72, at least two flow straightening chambers 74 are formed. Thus, it is possible to restrain occurrence of a gas swirl. Further, the number of the first partition walls 71 and the number of the second partition walls 72 do not need to be the same. Similarly, in the second embodiment, as long as there are at least two flow straightening chambers 94 in the flow straightening device 90, the number of the flow straightening chambers 94 may be changed as appropriate.

In the first embodiment, by changing the numbers and thicknesses of the first partition walls 71 and the second partition walls 72 of the flow straightening device 70, the total sectional area of the channels of the flow straightening chambers 74 of the flow straightening device 70 may be 50% or smaller of a sectional area of a channel of the exit hole 68a of the purge valve 65.

Figure 6:
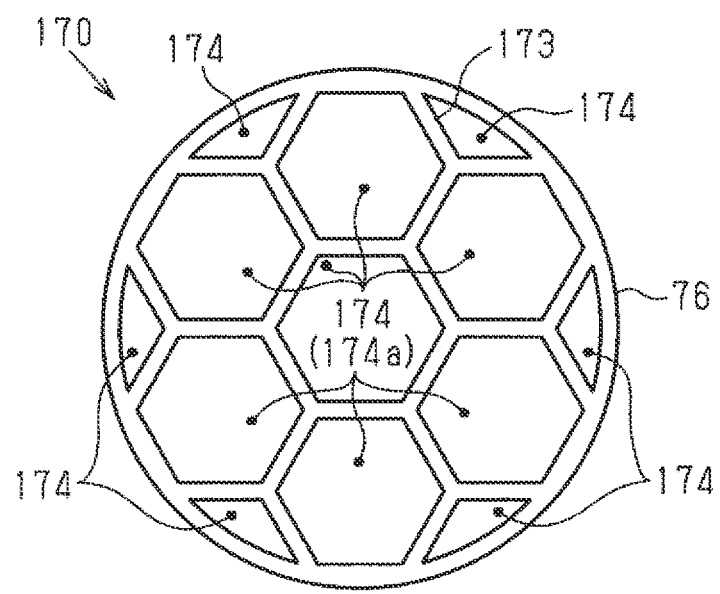
FIG. 6 is a front view of a flow straightening device according to a modification.

In the first embodiment, the shapes of the flow straightening chambers formed by the partition walls of the flow straightening device may be changed as appropriate. For example, as shown in FIG. 6, an interior space of a flow straightening device 170 may be divided by partition walls 173 into a plurality of flow straightening chambers 174, and the flow straightening chambers 174 may have a honeycomb shape so that the flow straightening chambers 174a having a regular hexagonal shape are adjacent to each other in a view of the flow straightening device 170 seen in a gas flow direction.

In the first embodiment, among the flow straightening chambers 74 of the flow straightening device 70, the number of the flow straightening chambers 74a that have the same shape and are adjacent to each other may be changed as appropriate. For example, among the flow straightening chambers 74, as long as two or more flow straightening chambers 74a have the same shape and are adjacent to each other, it is at least possible to restrain gas from intensively flowing into a specific flow straightening chamber 74a among the flow straightening chambers 74a that are adjacent to each other.

In the first embodiment, among the flow straightening chambers 74 of the flow straightening device 70, the flow straightening chambers 74 adjacent to each other may have different shapes from one another. For example, even when the flow straightening chambers 74 having different shapes are adjacent to each other, as long as gas does not excessively intensively flow into in a specific flow straightening chamber 74 among these flow straightening chambers 74, the flow straightening chambers 74 having the same shape do not need to be adjacent to each other. Also, in this case, all of the flow straightening chambers 74 may have different shapes from one another.

Figure 8A:
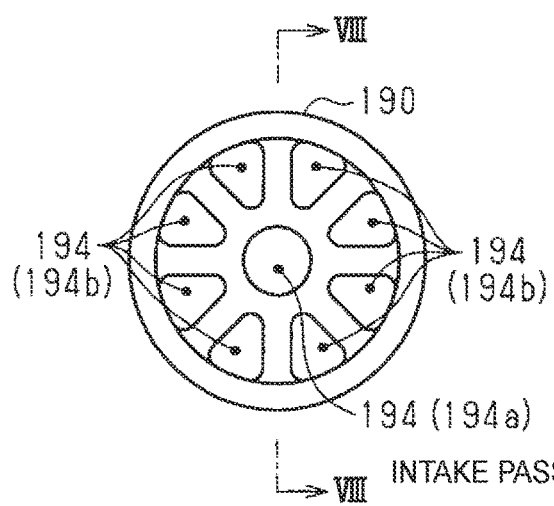
FIG. 8A is a front view of a flow straightening device according to a modification.
Figure 8B:
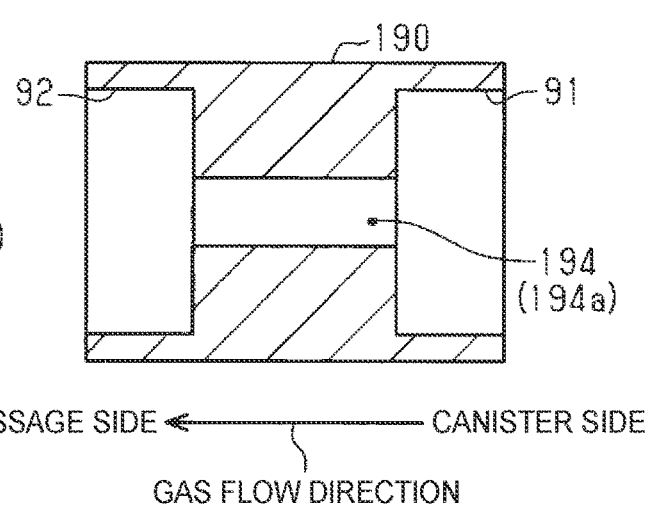
FIG. 8B is a sectional view of the flow straightening device taken along the line VIII-VIII in FIG. 8A.

In the second embodiment, shapes of the flow straightening chambers formed inside the flow straightening device may be changed as appropriate. For example, in an example shown in FIG. 8A and FIG. 8B, in a view seen in a gas flow direction, one circular flow straightening chamber 194a is formed inside a flow straightening device 190 at the center of the flow straightening device 190. Also, eight flow straightening chambers 194b are formed in a circumference direction at positions radially outward of the flow straightening chamber 194a. Each of the flow straightening chambers 194b has a sector shape that spreads towards the radially outer side in the view seen in the gas flow direction. In the configuration described above, the total sectional area of channels of the six flow straightening chambers 94 of the flow straightening device 90 is about 40% of a sectional area of a channel of an exit hole 68a of a purge valve 65.

In the first embodiment and the second embodiment, the position of each of the flow straightening device 70 and the flow straightening device 90 is not limited to the position adjacent to and downstream of the exit portion 68 of the purge valve 65. For example, each of the flow straightening device 70 and the flow straightening device 90 may be attached inside the exit hole 68a of the exit portion 68 of the purge valve 65. In this case, each of the flow straightening device 70 and the flow straightening device 90 is positioned at the connecting place X at which the exit portion 68 of the purge valve 65 is connected to the purge hose 57 of the purge passage 55. Further, each of the flow straightening device 70 and the flow straightening device 90 may be positioned at the connecting place at which the purge hose 57 is connected to the surge tank 11a.

Each of the flow straightening device 70 and the flow straightening device 90 may also be attached in an intermediate portion of the purge hose 57 of the purge passage 55. This means that each of the flow straightening device 70 and the flow straightening device 90 may be disposed at a position separated from the downstream end portion of the exit portion 68 of the purge valve 65. Also, in this case, the channel immediately upstream of the flow straightening device 90 in the gas flow direction is a channel inside the purge hose 57 of the purge passage 55.

Figure 7:
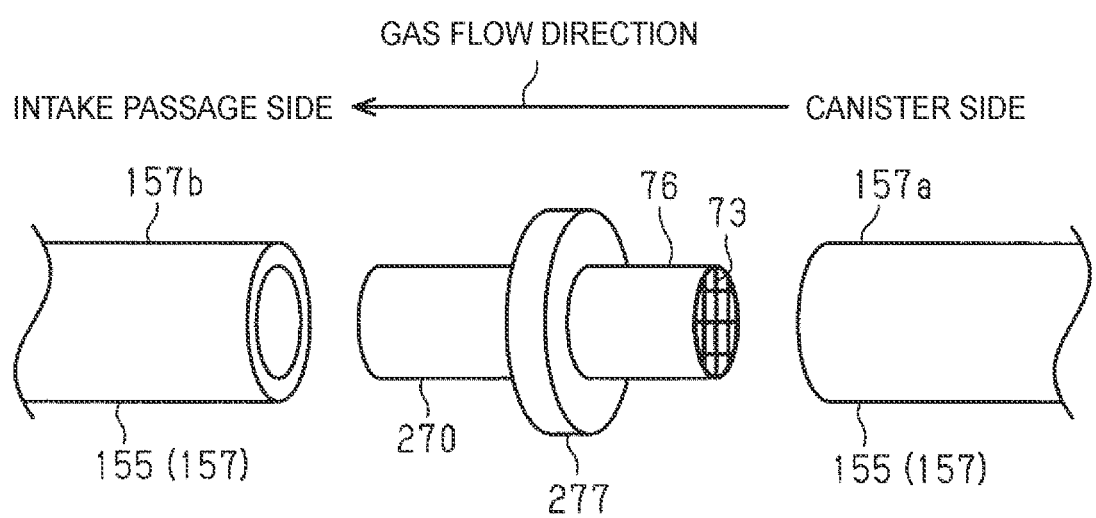
FIG. 7 is an exploded perspective view of a configuration for attaching a flow straightening device to a purge passage according to a modification.

In the first embodiment, the flow straightening device may be given a function as an adaptor that connects a plurality of purge hoses. For example, as shown in FIG. 7, a purge hose 157 of a purge passage 155 includes an upstream side purge hose 157a on a canister 52 side and a downstream side purge hose 157b on an air intake passage 11 side. A flow straightening device 270 is attached between the upstream side purge hose 157a and the downstream side purge hose 157b. A flange portion 277 projects from an outer surface of a shell portion 76 of the flow straightening device 270 to a radially outer side. The flange portion 277 is positioned at substantially the center of the shell portion 76 in the gas flow direction. The upstream side purge hose 157a is attached to a portion of the flow straightening device 270, which is located closer to the canister 52 than the flange portion 277 is. Also, the downstream side purge hose 157b is attached to a portion of the flow straightening device 270, which is located closer to the air intake passage 11 than the flange portion 277 is. Similarly, in the second embodiment, the flow straightening device may be given a function as an adapter that connects a plurality of purge hoses.

In the first and second embodiments, the purge passage 55 may be connected with the intake air connecting passage 11b of the air intake passage 11. In this case, the purge passage 55 may be connected with a portion of the air intake passage 11, the portion being located downstream of the throttle valve 21.

In the first and second embodiments, the connecting configuration in which the purge hose 57 of the purge passage 55 is connected to the exit portion 68 of the purge valve 65 may be changed as appropriate. For example, an upstream end of the purge hose 57 in the purge passage 55 and a downstream end of the exit portion 68 of the purge valve 65 may be connected with each other. In this case, joining surfaces of the upstream end of the purge hose 57 and the downstream end of the exit portion 68 serve as a connecting place at which the exit portion 68 of the purge valve 65 is connected to the purge hose 57 of the purge passage 55.

In the first and second embodiments, a material of the purge passage 55 may be changed as appropriate. For example, an upstream portion and a downstream portion of the purge passage 55 may both be made of steel or rubber.

In the first and second embodiments, a material of the flow straightening device 70 and the flow straightening device 90 may be changed as necessary. For example, the flow straightening device 70 and the flow straightening device 90 may be made of steel. In the second embodiment, one or both of the first recessed portion 91 and the second recessed portion 92 of the flow straightening device 90 may be omitted. For example, when both of the first recessed portion 91 and the second recessed portion 92 are omitted, the flow straightening chambers 94 may extend through the substantially columnar flow straightening device 90 from the end surface of the flow straightening device 90 on the canister 52 side to the end surface of the flow straightening device 90 on the air intake passage 11 side. Also, as described earlier, when the length of the flow straightening chambers 94 is changed, an amount of gas flowing in the flow straightening chambers 94 may be adjusted by changing the number and size of the flow straightening chambers 94.

In the second embodiment, the total sectional area of the channels of the six flow straightening chambers 94 of the flow straightening device 90 may be changed as appropriate within the range of 50% or smaller of the sectional area of the channel of the exit hole 68a of the purge valve 65. However, in order to avoid excessively restraining an amount of gas flowing in the flow straightening device 90, the total sectional area of the channels of the six flow straightening chambers 94 of the flow straightening device 90 may be 20% or larger with respect to the sectional area of the channel of the exit hole 68a of the purge valve 65.

What is claimed is:

1. A fuel vapor treatment apparatus comprising:
   a canister into which fuel vapor generated in a fuel tank is introduced, the canister being configured to absorb the fuel vapor;
   an outside air introducing passage that is connected with the canister and introduces outside air to the canister;
   a purge passage that connects the canister and a portion of an air intake passage, the portion of the air intake passage being located downstream of a throttle valve, wherein the fuel vapor treatment apparatus includes only a single purge passage to the air intake passage;
   a purge valve that is provided in the purge passage and switches a channel of the purge passage to one of an open state and a closed state; and
   a flow straightening device provided in an area extending from a connecting place at which an exit portion of the purge valve is connected to the purge passage, to a connecting place at which the purge passage is connected to the air intake passage, and wherein the flow straightening device is disposed at the connecting place at which the exit portion of the purge valve is connected to the purge passage, or a position adjacent to and downstream of the connecting place in a gas flow direction.

2. The fuel vapor treatment apparatus according to claim 1 wherein a plurality of flow straightening chambers are provided inside the flow straightening device, and the flow straightening chambers are arranged in at least one direction orthogonal to a gas flow direction.

3. The fuel vapor treatment apparatus according to claim 2, wherein:
   the flow straightening device includes
   a first partition wall that divides an interior space of the flow straightening device in a first direction orthogonal to the gas flow direction, and
   a second partition wall that divides the interior space of the flow straightening device in a second direction orthogonal to the gas flow direction and the first direction; and
   at least two adjacent flow straightening chambers among the flow straightening chambers formed by the first partition wall and the second partition wall have a same shape in a view of the flow straightening device seen in the gas flow direction.

4. The fuel vapor treatment apparatus according to claim 2, wherein a total sectional area of channels of the flow straightening chambers is 50% or smaller of a sectional area of a portion of a channel extending from the connecting place at which the exit portion of the purge valve is connected to the purge passage, to the connecting place at which the purge passage is connected to the air intake passage, the portion of the channel being located immediately upstream of the flow straightening device in the gas flow direction.

5. The fuel vapor treatment apparatus according to claim 1, wherein the purge passage is connected with a surge tank in the air intake passage.

6. The fuel vapor treatment apparatus according to claim 1, wherein the flow straightening device is separated from the purge valve.

7. The fuel vapor treatment apparatus according to claim 1, wherein gas exiting the flow straightening device flows from the flow straightening device directly to the air intake passage.

* * * * *